United States Patent
Kwon

(10) Patent No.: US 10,179,513 B2
(45) Date of Patent: *Jan. 15, 2019

(54) POWER NET SYSTEM OF FUEL CELL VEHICLE AND METHOD FOR CONTROLLING THE SAME

(71) Applicant: Hyundai Motor Company, Seoul (KR)

(72) Inventor: Sang Uk Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 215 days.

This patent is subject to a terminal disclaimer.

(21) Appl. No.: 14/963,786

(22) Filed: Dec. 9, 2015

(65) Prior Publication Data

US 2016/0375777 A1   Dec. 29, 2016

(30) Foreign Application Priority Data

Jun. 24, 2015 (KR) .......... 10-2015-0090047

(51) Int. Cl.
   *H02M 7/44*      (2006.01)
   *B60L 11/18*     (2006.01)
   (Continued)

(52) U.S. Cl.
   CPC ....... *B60L 11/1803* (2013.01); *B60L 11/1887* (2013.01); *H01M 8/04559* (2013.01);
   (Continued)

(58) Field of Classification Search
   CPC ............ B60L 11/1803; B60L 11/1887; H01M 8/04559; H01M 8/04664; H01M 8/04753;
   (Continued)

(56) References Cited

U.S. PATENT DOCUMENTS

2016/0133959 A1*  5/2016  Kwon ................. H01M 8/0488
                                                            429/429
2016/0137100 A1*  5/2016  Nishida ............... B60L 11/1887
                                                            701/22

(Continued)

FOREIGN PATENT DOCUMENTS

JP     2009-165243 A       7/2009
JP    2009165243 A  *      7/2009
(Continued)

*Primary Examiner* — Ryan Jager
(74) *Attorney, Agent, or Firm* — Mintz Levin Cohn Ferris Glovsky and Popeo, P.C.; Peter F. Corless

(57) ABSTRACT

A power net system of a fuel cell vehicle is provided. The power net system includes a fuel cell and a high-voltage battery unit connected in parallel via a main bus and a first switching unit that is configured to form and block an electrical connection between an output terminal of the fuel cell and the main bus. A load device diverges and is connected between the output terminal of the fuel cell and the first switching unit. A reverse current blocking unit is connected between the first switching unit and a node from which the load device diverges. A second switching unit is configured to form and block an electrical connection between the output terminal of the fuel cell and the load device. A controller operates the first and second switching units and adjusts the electrical connection state between the main bus and the high-voltage battery unit.

11 Claims, 2 Drawing Sheets

(51) Int. Cl.
　　*H02J 7/34* (2006.01)
　　*H02J 1/10* (2006.01)
　　*H01M 8/04858* (2016.01)
　　*H01M 8/04955* (2016.01)
　　*H01M 16/00* (2006.01)
　　*H01M 8/04537* (2016.01)
　　*H01M 8/04664* (2016.01)
　　*H01M 8/04746* (2016.01)
　　*H02J 1/00* (2006.01)

(52) U.S. Cl.
　　CPC ... *H01M 8/04664* (2013.01); *H01M 8/04753* (2013.01); *H01M 8/04917* (2013.01); *H01M 8/04955* (2013.01); *H01M 16/006* (2013.01); *H02J 1/108* (2013.01); *H02J 7/34* (2013.01); *H01M 2250/20* (2013.01); *H02J 2001/004* (2013.01); *Y02T 90/32* (2013.01); *Y02T 90/34* (2013.01)

(58) Field of Classification Search
　　CPC ......... H01M 8/04917; H01M 8/04955; H01M 16/006; H02J 1/108; H02J 7/34
　　USPC ....................................................... 307/10.1
　　See application file for complete search history.

(56) References Cited

U.S. PATENT DOCUMENTS

| | | | | |
|---|---|---|---|---|
| 2016/0141673 | A1* | 5/2016 | Kakeno | H01M 8/04313 429/9 |
| 2016/0141681 | A1* | 5/2016 | Kakeno | H01M 8/04753 429/9 |
| 2016/0375778 | A1* | 12/2016 | Kwon | B60L 11/1803 307/10.1 |
| 2017/0102432 | A1* | 4/2017 | Foley | G01N 27/06 |
| 2017/0166081 | A1* | 6/2017 | Kwon | B60L 11/1887 |

FOREIGN PATENT DOCUMENTS

| | | | | |
|---|---|---|---|---|
| JP | 2010-176864 | A | | 8/2010 |
| JP | 2013-027275 | A | | 2/2013 |
| JP | 2013027275 | A | * | 2/2013 |
| JP | 2013-187941 | A | | 9/2013 |
| KR | 10-2008-0032909 | A | | 4/2008 |
| KR | 10-2008-0054008 | A | | 6/2008 |
| KR | 10-0878661 | B1 | | 1/2009 |
| KR | 2010-0060478 | A | | 6/2010 |
| WO | WO 2013161340 | A1 | * | 10/2013 ............ H01M 10/44 |

* cited by examiner

POWER NET SYSTEM OF FUEL CELL VEHICLE AND METHOD FOR CONTROLLING THE SAME

CROSS REFERENCE TO RELATED APPLICATION

The present application claims priority to Korean Patent Application No. 10-2015-0090047, filed Jun. 24, 2015, the entire contents of which is incorporated herein for all purposes by this reference.

BACKGROUND

Field of the Disclosure

The present disclosure relates to a power net system of a fuel cell vehicle and a method for controlling the same, and more particular, to a power net system of a fuel cell vehicle, that prevents a risk of exposure to a high voltage by rapidly removing a voltage of a fuel cell stack in a dangerous situation such as collision, and a method for controlling the same.

Description of the Related Art

A fuel cell system which is applied to a hydrogen fuel cell vehicle as one of environment-friendly vehicles includes a fuel cell stack configured to generate electrical energy from an electrochemical reaction of reaction gas; a hydrogen supply device configured to supply hydrogen as fuel to the fuel cell stack; an air supply device configured to supply air containing oxygen to the fuel cell stack, the oxygen serving as an oxidizer required for an electrochemical reaction; and a heat and water management system configured to adjust the operation temperature of the fuel cell stack to an optimal temperature by discharging heat as a by-product of the electrochemical reaction of the fuel cell stack to the exterior, and perform a water management function.

A fuel cell load device for reducing and removing the voltage of the fuel cell stack is connected to the fuel cell stack to remove oxygen inside the fuel cell stack while and after the start of the fuel cell vehicle is stopped. The oxygen introduced to the fuel cell stack is removed with remaining hydrogen of the anode, while the current is consumed through the fuel cell load device. When the anode is out of hydrogen, oxygen cannot be consumed. Thus, to prevent such a situation, the wakeup technology is used to periodically supply hydrogen to the anode.

In other words, the fuel cell vehicle requires a separate post process for decreasing the voltage of the fuel cell stack by removing remaining air inside the fuel cell stack after start off, unlike the internal-combustion engine. Accordingly, the deterioration of the fuel cell stack and a risk of exposure to a high voltage may be prevented. When a voltage is formed while oxygen is in the anode, carbon corrosion occurs at the cathode. Thus, the fuel cell vehicle requires a process of removing oxygen inside the fuel cell stack, preventing an additional oxygen flow, and removing oxygen which is inevitably introduced.

When a dangerous situation such as collision occurs, the conventional fuel cell vehicle is forced to use the fuel cell load device to decrease the voltage of the fuel cell stack, thereby preventing a risk of exposure to a high voltage. The conventional fuel cell vehicle electrically connects only the load device to the fuel cell to decrease the voltage of the fuel cell. The process has no difference from a post process of decreasing the voltage of the fuel cell after start-off in a normal state. Thus, since the conventional fuel cell vehicle has no separate device for decreasing the voltage of the fuel cell in case of an emergency situation such as a collision, the high voltage may not be removed rapidly. Furthermore, since the fuel cell in the high-voltage state may be exposed, a risk such as an electrical shock still exists.

The foregoing is intended merely to aid in the understanding of the background of the present disclosure, and is not intended to mean that the present disclosure falls within the purview of the related art that is already known to those skilled in the art.

SUMMARY

Accordingly, the present provides a power net system of a fuel cell vehicle, capable of preventing a risk of exposure to a high voltage by rapidly removing a voltage of a fuel cell stack in case of a dangerous situation such as collision, and a method for controlling the same.

According to one aspect, a power net system of a fuel cell vehicle may include: a fuel cell and a high-voltage battery unit connected in parallel via a main bus; a first switching unit configured to form/block electrical connection between an output terminal of the fuel cell and the main bus; a load device diverging and connected between the output terminal of the fuel cell and the first switching unit; a reverse current blocking unit connected between the first switching unit and a node from which the load device diverges; a second switching unit configured to form/block electrical connection between the output terminal of the fuel cell and the load device; and a controller configured to operate the first and second switching units and adjust the electrical connection state between the main bus and the high-voltage battery unit to cause power of the output terminal of the fuel cell to be consumed through the load device and a charge operation of the high-voltage battery, when a preset dangerous event occurs.

When the preset dangerous event occurs, the controller may be configured to block the supply of hydrogen and oxygen to the fuel cell before operating the first and second switching units. Additionally, when the preset dangerous event occurs, the controller may be configured to determine whether the high-voltage battery unit may be charged. When the high-voltage battery unit may be charged, the controller may be configured to operate the first and second switching units to be shorted, and operate a high-voltage converter in the high-voltage battery unit to decrease the voltage of the main bus. When the high-voltage battery unit may not be charged, the controller may be configured to operate the first switching unit to be opened, operate the second switching unit to be shorted, and block the electrical connection between the high-voltage battery unit and the main bus. When the voltage of the output terminal of the fuel cell becomes less than a preset voltage, the controller may be configured to operate the first and second switching units to be opened, and block the electrical connection between the high-voltage battery unit and the main bus.

According to another aspect, a method for controlling a power net system of a fuel cell vehicle may include: sensing, by a controller, whether a preset dangerous event occurs; determining, by the controller, whether a high-voltage battery unit connected in parallel to a fuel cell via a main bus may be charged; and forming, by the controller, electrical connection between an output terminal of the fuel cell and a load device and electrical connection between the fuel cell and the high-voltage battery unit, in response to determining that the high-voltage battery unit may be charged. The power of the output terminal of the fuel cell may be consumed through the load device and a charge operation of the high-voltage battery unit.

Further, the controller may be configured to operate a high-voltage converter in the high-voltage battery unit to decrease the voltage of the main bus when determining whether the high-voltage battery unit may be charged. The method may further include forming, by the controller, the electrical connection between the fuel cell output terminal and the load device and blocking the electrical connection between the fuel cell and the high-voltage battery unit, in response to determining that the high-voltage battery unit may not be charged. The method may further include blocking, by the controller, hydrogen and oxygen supplied to the fuel cell, before determining whether the high-voltage battery unit may be charged.

The method may further include: comparing, by the controller, the voltage of the output terminal of the fuel cell to a preset voltage, after forming the electrical connections; and blocking, by the controller, the electrical connection between the output terminal of the fuel cell and the load device, the electrical connection between the output terminal of the fuel cell and the main bus, and the electrical connection between the high-voltage battery unit and the main bus, in response to determining that the voltage of the output terminal of the fuel cell is less than the preset voltage.

According to another aspect, a method for controlling a power net system of a fuel cell vehicle is provided. In particular, when a preset dangerous event occurs, a controller may be configured to form electrical connection between an output terminal of a fuel cell and a load device and electrical connection between the fuel cell and a high-voltage battery unit connected in parallel to the fuel cell via a main bus, to cause power of the output terminal of the fuel cell to be consumed through the load device and a charge operation of the high-voltage battery unit.

According to the exemplary embodiments of the present disclosure, the power net system of the fuel cell vehicle and the method for controlling the same may remove remaining power of the output terminal of the fuel cell more rapidly and efficiently than when only the load device is used to remove remaining power of the output terminal of the fuel cell. Thus, the power net system of the fuel cell vehicle and the method for controlling the same may rapidly decrease the high voltage of the output terminal of the fuel cell when a collision accident of the fuel cell vehicle occurs, thereby preventing an accident such as electric shock.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, an exemplary embodiment of the present disclosure will be described with reference to the attached drawings.

Figure 1:
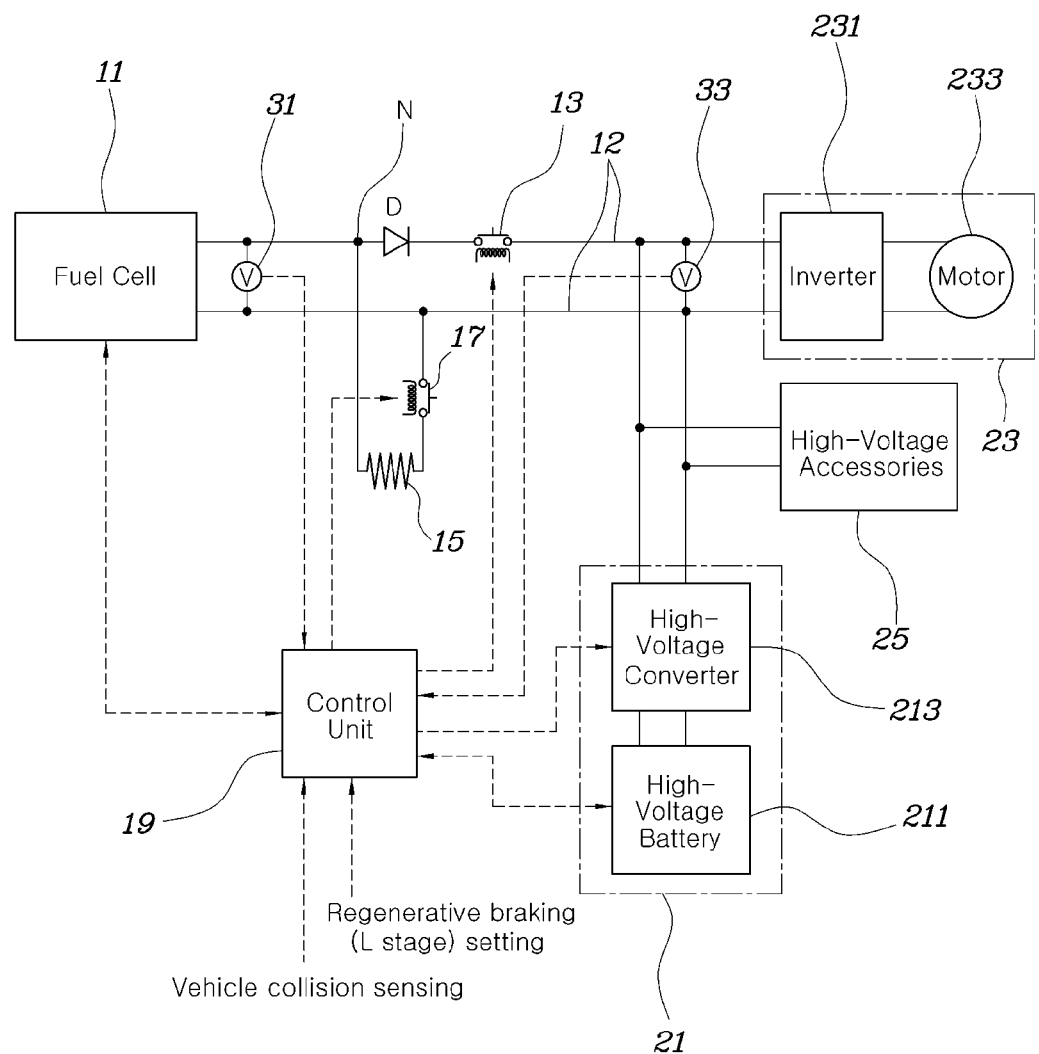
FIG. 1 is a configuration diagram illustrating a power net system of a fuel cell vehicle according to an exemplary embodiment of the present disclosure.

FIG. 1 is a configuration diagram illustrating a power net system of a fuel cell vehicle according to an exemplary embodiment of the present disclosure. Referring to FIG. 1, the power net system of the fuel cell vehicle may include a fuel cell 11 and a high-voltage battery unit 21 connected in parallel via a main bus 12; a first switching unit 13 configured to form and block electrical connection between an output terminal of the fuel cell 11 and the main bus 12; a load device 15 diverging and connected between the output terminal of the fuel cell 11 and the first switching unit 13; a second switching unit 17 configured to form and block electrical connection between the output terminal of the fuel cell 11 and the load device 15; and a controller 19 configured to operate the first and second switching units 13 and 17 and adjust the electrical connection state between the main bus 12 and the high-voltage battery unit 21.

The power net system according to the exemplary embodiment of the present disclosure may include a reverse current blocking unit D between the output terminal of the fuel cell 11 and the first switching unit 13. In particular, the reverse current blocking unit D may be disposed between the first switching unit 13 and a node N from which the load device 15 diverges. The reverse current blocking unit D may be configured to block a current flow to the output terminal of the fuel cell 11 and the load device 15 from the main bus 12, when the first switching unit 13 is shorted. The reverse current blocking unit D may include a diode D of which the anode and cathode may be connected to the diverging node N of the load device and the first switching unit 13, respectively.

The high-voltage battery unit 21 may operate as an auxiliary power supply of the fuel cell vehicle using the fuel cell 11 as a main power supply. The high-voltage battery unit 21 may include a high-voltage battery 211 configured to store power and a two-way high-voltage converter 213 configured to convert an output of the high-voltage battery 211 into a voltage and provide the voltage to the main bus 12 or convert power input from the main bus 12 into a voltage and provide the voltage to the high-voltage battery 211 to charge the high-voltage battery 211. The high-voltage battery 211 may include a switching unit such as a relay. The open state/short-circuit state of the switching unit in the high-voltage battery 211 may be adjusted by the controller 19. Thus, the electrical connection between the high-voltage battery 211 and the main bus 12 may be formed/blocked.

The high-voltage converter 213 may include a plurality of switching elements which may be pulse width modulation (PWM)-controlled to determine the magnitude of a voltage converted during the voltage conversion process. The plurality of switching elements in the high-voltage converter 213 may be PWM-controlled by the controller 19, and the electrical connection between the high-voltage battery 211 and the main bus 12 may be formed/blocked by the operation of the switching elements.

In FIG. 1, reference numeral 23 represents a driving motor unit. The driving motor unit 23 may be configured to generate power using the voltage provided from the fuel cell 11 operating as a main power supply or the high-voltage battery unit 21 operating as an auxiliary power supply. The driving motor unit 23 may include an inverter 231 configured to convert direct current (DC) power input from the main bus 12 into alternating current (AC) power and a driving motor 233 driven by the AC power provided from the inverter 231.

FIG. 1 illustrates that the switching units 13 and 17 are relays for shorting/opening connection between nodes through the electromagnetic induction method. However, the switching units 13 and 17 may be replaced with various types of controllable switching units which are applied to the art. Reference numeral 25 represents a variety of high-voltage accessories connected to the main bus 12 and use a high voltage, and reference numerals 31 and 33 represent voltage sensors configured to sense the voltage of the output terminal of the fuel cell 11 and the voltage of the main bus 12.

In the power net system of the fuel cell vehicle according to the exemplary embodiment of the present disclosure, when a preset specific event such as a vehicle collision occurs, the controller 19 may be configured to operate the first and second switching units 13 and 17 and adjust the high-voltage battery unit 21 to cause the power of the output terminal of the fuel cell 11 to be consumed through the load device 15 and simultaneously consumed by charging the high-voltage battery unit. Accordingly, when the fuel cell vehicle according to the exemplary embodiment of the present disclosure is in a dangerous situation such as a collision accident, the power of the output terminal of the fuel cell 11 may be consumed by the load device 15 and simultaneously consumed by charging the high-voltage battery 211 in the high-voltage battery unit 21. Thus, the voltage of the output terminal of the fuel cell 11 may be reduced more rapidly.

Hereafter, a method for controlling the power net system of the fuel cell vehicle according to the exemplary embodiment of the present disclosure will be described in more detail.

Figure 2:
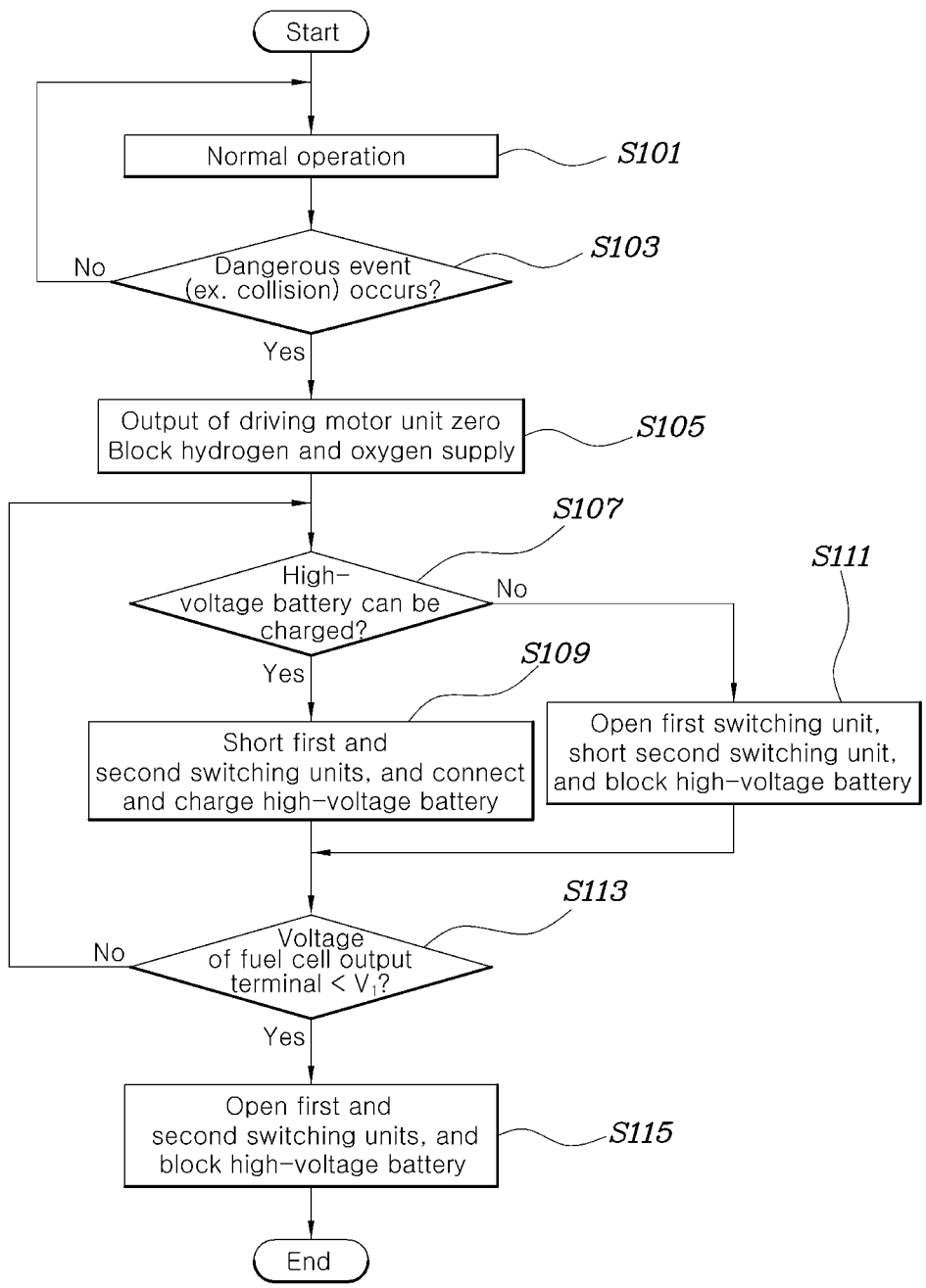
FIG. 2 is a flowchart illustrating a method for controlling a power net system of a fuel cell vehicle according to an exemplary embodiment of the present disclosure.

FIG. 2 is a flowchart illustrating a method for controlling a power net system of a fuel cell vehicle according to an exemplary embodiment of the present disclosure. The control method illustrated in FIG. 2 may be performed when a dangerous event such as a collision accident occurs in the fuel cell vehicle. When a dangerous event such as a collision accident occurs, the output terminal of the fuel cell 11 may be exposed or shorted to external equipment or the human body. Such a dangerous event may be sensed by various sensors (not illustrated) installed within the vehicle. The various sensors may include a shock sensor. When information sensed by the sensors is input to the controller 19, the controller 19 may be configured to verify whether a dangerous event has occurred.

Referring to FIG. 2, when a preset dangerous event occurs at step S103 while the fuel cell vehicle having the power net system according to the exemplary embodiment of the present disclosure is normally operated at step S101, the controller 19 may be configured to block hydrogen and oxygen supplied to the stack of the fuel cell 11, and stop the operation of the fuel cell 11 at step S105. At step S101, power output from the fuel cell 11 may be provided to the driving motor unit 23 via the main bus 12 when the first switching unit 13 is shorted, and the second switching unit 17 is opened. Furthermore, at step S105, the controller 19 may be configured to adjust the output of the driving motor 233 in the driving motor unit 23 to zero.

Then, the controller 19 may be configured to determine whether the high-voltage battery unit 21 may be charged, at step S107. At step S107 of determining whether the high-voltage battery unit 21 may be charged, the controller 19 may be configured to receive information regarding whether the high-voltage converter 212 or the high-voltage battery 211 of the high-voltage battery unit 21 broke down (e.g., whether an error or failure occurred) or whether the state of charge (SOC) of the high-voltage battery 211 is excessively high.

In response to determining that the high-voltage battery unit may be charged, the controller 19 may be configured to operate the first and second switching units 13 and 17 to be shorted, and operate the high-voltage converter 212 to charge the high-voltage battery 211 in the high-voltage battery unit 21, to thus decrease the voltage of the main bus 12, at step S109. In particular, the output terminal of the fuel cell 11 may be electrically connected to the load device 15 and the high-voltage battery unit 21, and the voltage of the main bus 12 may be decreased. Thus, the power remaining in the output terminal of the fuel cell 11 may be removed while the power is consumed by the load device 15 and the high-voltage battery 211 of the high-voltage battery unit 21 may be charged.

In the exemplary embodiment of the present disclosure, the remaining power of the output terminal of the fuel cell 11 may be removed more rapidly and efficiently than when only the load device 15 is used to remove the remaining power of the output terminal of the fuel cell 11. Thus, when a collision accident occurs, the high voltage of the output terminal of the fuel cell 11 may be rapidly decreased to prevent an accident such as electrical shock.

In a general fuel cell vehicle, the fuel cell and the load device exist in an engine mom, but the high-voltage battery unit is positioned on the underfloor. In other words, the high-voltage battery unit is disposed at a safer position than the fuel cell. The exemplary embodiment of the present disclosure considers the necessity to rapidly remove a high voltage of the fuel cell which is much greater than that of the high-voltage battery, based on the arrangement structure of the fuel cell and the high-voltage battery unit of the general fuel cell vehicle. Accordingly, the high-voltage battery and the high-voltage converter may be disposed in a region where the high-voltage battery and the high-voltage converter are likely to be operated normally (e.g., without failure) even during a collision accident. Thus, removing the remaining voltage of the fuel cell through the charge operation of the high-voltage battery during a collision accident is a realistic and safe approach.

Furthermore, in response to determining that the high-voltage battery unit may not be charged, the controller 19 may be configured to operate the first switching unit 13 to be opened and operate the second switching unit 17 to be shorted, at step S111. Through the control of the controller 19, electrical connection between the output terminal of the fuel cell 11 and the load device 15 may be formed, and the electrical connection between the fuel cell 11 and the high-voltage battery unit 21 may be blocked. In particular, at step S111, the controller 19 may be configured to block the connection between the high-voltage battery unit 21 and the main bus 12. During the process of blocking the electrical connection between the high-voltage battery unit 21 and the main bus 12, the controller 19 may be configured to operate a relay (not illustrated) formed in the high-voltage battery 211 to block the connection between the high-voltage battery 211 and the high-voltage converter 213, or operate the switching elements in the high-voltage converter 213 to electrically insulate the high-voltage battery 211 and the main bus 12 from each other. Both of the methods may be applied.

Moreover, the controller 19 may be configured to compare the voltage of the output terminal of the fuel cell 11 to a preset voltage $V_1$, and determine whether the voltage of the output terminal of the fuel cell 11 is less than the preset voltage $V_1$, at step S113. At step S113, the controller 19 may be configured to receive the magnitude information of the voltage of the output terminal of the fuel cell 11 from the voltage sensor 31 configured to sense the voltage of the output terminal of the fuel cell 11, and compare the voltage of the output terminal of the fuel cell 11 to the preset voltage $V_1$. The voltage $V_1$ may be preset to a low voltage value at which safety may be secured even when the voltage of the output terminal of the fuel cell 11 is exposed to the human body or the like. The steps S107, S109, and S111 may be continuously maintained until the voltage of the output terminal of the fuel cell 11 becomes less than the preset voltage $V_1$.

When the voltage of the output terminal of the fuel cell 11 decreases to be less than the preset voltage $V_1$, the controller 19 may be configured to operate the first and second switching units 13 and 17 to be opened, thereby blocking the electrical connection between the fuel cell 11 and the main bus 12 and the electrical connection between the fuel cell 11 and the load device 15. Furthermore, when the high-voltage battery unit 21 is charged at step S109, the controller 19 may be configured to block the connection between the high-voltage battery unit 21 and the main bus 12.

Although exemplary embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A power net system of a fuel cell vehicle, comprising:
   a fuel cell and a high-voltage battery unit connected in parallel via a main bus;
   a first switching unit configured to form and block an electrical connection between an output terminal of the fuel cell and the main bus;
   a load device diverging and connected between the output terminal of the fuel cell and the first switching unit;
   a reverse current blocking unit connected between the first switching unit and a node from which the load device diverges;
   a second switching unit configured to form and block an electrical connection between the output terminal of the fuel cell and the load device; and
   a controller configured to operate the first and second switching units and the electrical connection state between the main bus and adjust the high-voltage battery unit to cause power of the output terminal of the fuel cell to be consumed by the load device and a charge operation of the high-voltage battery, when a preset event occurs, wherein the preset event is a vehicle collision.

2. The power net system of claim 1, wherein when the preset event occurs, the controller is configured to block the supply of hydrogen and oxygen to the fuel cell before operating the first and second switching units.

3. The power net system of claim 1, wherein when the preset event occurs, the controller is configured to determine whether the high-voltage battery unit can be charged.

4. The power net system of claim 3, wherein when the high-voltage battery unit can be charged, the controller is configured to operate the first and second switching units to be shorted, and operate a high-voltage converter in the high-voltage battery unit to decrease the voltage of the main bus.

5. The power net system of claim 3, wherein when the high-voltage battery unit cannot be charged, the controller is configured to operate the first switching unit to be opened, operate the second switching unit to be shorted, and block the electrical connection between the high-voltage battery unit and the main bus.

6. The power net system of claim 1, wherein when the voltage of the output terminal of the fuel cell decreases to be less than a preset voltage, the controller is configured to operate the first and second switching units to be opened, and block the electrical connection between the high-voltage battery unit and the main bus.

7. A method for controlling a power net system of a fuel cell vehicle, comprising:
   sensing, by a controller, whether a preset event occurs, wherein the preset event is a vehicle collision;
   determining, by the controller, whether a high-voltage battery unit connected in parallel to a fuel cell via a main bus can be charged; and
   forming, by the controller, an electrical connection between an output terminal of the fuel cell and a load device and an electrical connection between the fuel cell and the high-voltage battery unit, in response to determining that the high-voltage battery unit can be charged, wherein power of the output terminal of the fuel cell is consumed by the load device and a charge operation of the high-voltage battery unit, and wherein a reverse current blocking unit is disposed between the output terminal of the fuel cell and a first switching unit configured to form or block electrical connection between the output terminal of the fuel cell and the main bus, in order to block a current flow to the output terminal of the fuel cell and the lead device from the main bus when the first switching unit is shorted.

8. The method of claim 7, wherein the controller is configured to operate a high-voltage converter in the high-voltage battery unit to decrease the voltage of the main bus in response to determining that the high-voltage battery unit can be charged.

9. The method of claim 7, further comprising:
forming, by the controller, the electrical connection between the fuel cell output terminal and the load device and blocking the electrical connection between the fuel cell and the high-voltage battery unit, in response to determining that the high-voltage battery unit cannot be charged.

10. The method of claim 7, further comprising:
blocking, by the controller, hydrogen and oxygen supplied to the fuel cell, determining whether a high-voltage battery unit connected in parallel to a fuel cell via a main bus can be charged.

11. The method of claim 7, further comprising:
comparing, by the controller, the voltage of the output terminal of the fuel cell to a preset voltage, after forming the electrical connections; and blocking, by the controller, the electrical connection between the output terminal of the fuel cell and the load device, the electrical connection between the output terminal of the fuel cell and the main bus, and the electrical connection between the high-voltage battery unit and the main bus, in response to determining that the voltage of the output terminal of the fuel cell is less than the preset voltage.

\* \* \* \* \*